UNITED STATES PATENT OFFICE.

JOEL FARNAM, OF STILLWATER, NEW YORK.

IMPROVEMENT IN THE MANUFACTURE OF POTTERY-WARE.

Specification forming part of Letters Patent No. 4,242, dated October 25, 1845.

To all whom it may concern:

Be it known that I, JOEL FARNAM, of Stillwater, in the county of Saratoga and State of New York, have invented a new and useful improvement in combinations of matter which may be converted or manufactured into various articles as usually practiced in making pottery-ware and otherwise in "mixtures for bodies," so-called; and I do hereby declare that the following is a full and exact statement of combination and proportions of each of the materials as set forth and embraced together, which materials have to be reduced to a fine flour, and mixed together for use.

Ocher, pulverized, one part; soapstone, floured, one part; marl, ground, one part; alum dissolved with water, one-half part; kaolin or feldspar, ground fine, one-sixteenth part; barytes, ground fine, one-sixteenth part; ashes and brine, one-sixteenth part. Mix together well for use.

What I claim as my improvement or invention, and desire to secure by Letters Patent, is—

The combination of materials and proportions as embraced in this application for making into various articles that the composition will admit of by molding, turning, or pressing, burning, and glazing, which is a great improvement for some articles over clay in use of ocher.

JOEL FARNAM.

Witnesses:
 JOHN ELME,
 J. V. BRADHEW.